United States Patent [19]

Gravert

[11] 4,309,483

[45] Jan. 5, 1982

[54] ANTI-STATIC COATING ON ULLAGE TAPES COMPRISING CARBON BLACK DERIVED FROM A RICH ACETYLENE FLAME

[76] Inventor: William H. Gravert, 21 Orchard Farm Rd., Port Washington, N.Y. 11050

[21] Appl. No.: 77,987

[22] Filed: Sep. 24, 1979

[51] Int. Cl.³ .................... B32B 25/02; B32B 33/00; G01F 23/04; G01F 23/27

[52] U.S. Cl. .................... 428/421; 73/428; 141/83; 141/95; 427/122; 427/249; 428/422; 428/688

[58] Field of Search ............ 428/422, 538, 922, 421, 428/688; 427/122, 249; 73/428; 141/83, 95; 242/84.8

[56] References Cited

U.S. PATENT DOCUMENTS

| | | | |
|---|---|---|---|
| 2,788,296 | 4/1957 | Louis | 427/249 |
| 3,293,066 | 12/1966 | Gravert | 242/84.8 |
| 3,829,327 | 8/1974 | Omori et al. | 427/249 |
| 3,944,686 | 3/1976 | Froberg | 427/249 |
| 4,189,514 | 2/1980 | Johnson | 428/922 |
| 4,194,027 | 3/1980 | Adams et al. | 427/249 |

Primary Examiner—James C. Cannon
Attorney, Agent, or Firm—McAulay, Fields, Fisher, Goldstein & Nissen

[57] ABSTRACT

A static electric charge removal of dispersal coating for ullage tapes having an outer polymeric surface. The coating is formed of carbon black and is applied to the polymeric surface of the ullage tape to disperse therefrom any static electric charge which may be generated thereon when used for measurement purposes in large tanks which can build up a high static charge therein. The carbon black coating is preferably acetylene black formed on the tape and simultaneously anchored thereto by passing the tape near a fuel rich acetylene flame. Any excess coating which is not anchored to the tape can be removed by wiping or other similar operation.

The method of this invention can be used to apply an acetylene black coating to polymeric items such as fluorocarbon wire, tape, or other forms which can be passed in close proximity to a fuel rich acetylene flame.

8 Claims, 2 Drawing Figures

ANTI-STATIC COATING ON ULLAGE TAPES COMPRISING CARBON BLACK DERIVED FROM A RICH ACETYLENE FLAME

BACKGROUND OF THE INVENTION

This invention relates to a method of treating an ullage tape having a polymeric surface to prevent the build-up of electrostatic charge therein and to an ullage tape having an anti-static coating therein.

More particularly, the present invention is concerned with a method of coating an ullage tape to provide carbon black or lamp black thereon and to an ullage tape having carbon black or lamp black coated thereon to prevent static charge build-up on the tape.

In applicant's earlier U.S. Pat. No. 4,123,753, there is disclosed a metallic tape which provides for the leakage of charges accumulated on the outer jacket to be leaked therethrough for dissipation to the ground.

Although the present invention is generally applicable to the application of a carbon black coating to various polymeric substrates, it is particularly applicable to the coating of "Tefzel" fluoropolymer film tapes used to form ullage measuring devices.

The type of ullage measuring device to which the present invention is intended to be applied, is basically the weighted tape type of device wherein a weight pulls a tape down into a large liquid cargo tank until it reaches the surface of the liquid. The amount of liquid necessary to fill the rest of the tank can be estimated from the depth of the level of liquid in the tank. While the coating is particularly intended for the tape used in applicant's "Ullage Measuring Device" disclosed in the aforenoted U.S. Pat. No. 4,123,753, it is also particularly useful wherever electrostatic charge build-up on a "Fluorocarbon" material is to be prevented.

Static charge build up is a particular problem in large tanks which are in tanker ships used for carrying flammable liquids. The danger of explosion is high as the liquid inside the tank can be ignited from a spark caused by static electric charges. It is not uncommon for large tankers to have generated high static charges in the vapor over the liquid carried in the tanks during loading and cargo handling.

As is mentioned in U.S. Pat. No. 4,123,753, at column 3, lines 13-29, the device disclosed therein contemplates the use of a tape assembly or construction which has an outer protective covering of insulating material which is knurled or dimpled so as to provide for an irregular surface cover for the metallic tape. A tape construction with an irregular covering surface is especially useful in those situations where there is a large static charge build-up. As further noted in column 3 of U.S. Pat. No. 4,123,753, this construction helps to reduce static charge build up because the charge leaks through and is dissipated by the metal tape into the dimpled insulating surface protection cover.

Liquid antistatics are clear liquids, making it difficult to determine if the tape is safely coated. My coating produces a light haze color to show the tape is coated. It has also been suggested that various antistatic coatings be sprayed onto the surface of the tape to reduce or neutralize static charges thereon. However, in practice, these have been found to be impractical. Although liquid antistatic agents are reasonably efficient, they are removed when the tape is cleaned between measurements. Thus, although such antistatic agents may work for a single measurement, the use of the tape for measuring a number of tanks one after another becomes messy and awkward, particularly as is usual when a ship with 20 tanks is to be measured. After each measurement, the tape must be cleaned and then recoated before it can be used for the next measurement.

The use of carbon black to give polymeric materials sufficient conducting properties to disperse static electric charges is known. However, the application of a layer by a method analogous to the method of the present Application, and the use of a carbon layer in conjunction with ullage tapes or the like, appears unknown.

U.S. Pat. No. 2,997,451 discloses a method whereby various amounts of carbon black, made by many different methods, are mixed into thermoplastic resins to give the resins sufficient conductivity to reduce "static" when phonograph records are played. U.S. Pat. No. 3,249,559 teaches the application of a coating of graphite to polytetrafluoroethylene (PTFE) by using a solvent carrier.

U.S. Pat. No. 3,753,765 teaches the application of a dispersed carbon black pigment layer to the black of a polymeric photographic film support. But, according to the disclosure, the use of a binder is specifically required.

The disclosure of U.S. Pat. No. 3,865,626, is similar to the disclosure of U.S. Pat. No. 3,249,559 in that the polymer is treated with a solvent or other swelling agent to cause the carbon particles to adhere to the surface. It is further disclosed that the surface may be heat treated to improve the anchoring of the layer to the surface of the polyester material.

In summary, although it is known to use carbon black to impart conductivity to various polymeric items, the use of such a method for ullage tapes or the like is not shown or suggested. In addition, the method of applying carbon to elongated polymeric strips and in particular to elongated polytetrafluoroethylene or "Tefzel" (registered trademark of E.I. Dupont DeNemours & Company), coated tapes using a fuel rich acetylene torch to form and anchor the carbon directly onto the strip in one step, as it passes by the torch, is not shown or suggested in the prior art. This process produces a stable conductive coating.

It is therefore an object of the present invention to provide an efficient static electric charge dispersing coating which is permanent and will not rub off during normal cleaning of the tape of an ullage measuring device.

It is a further object to provide a simple and efficient method of applying such a static electric charge removal coating to an ullage measuring device.

It is a related object to provide a method for applying a carbon black coating to polymeric material without the need for special solvents or adhesive bases. It is a still further object to apply such a coating in particular polytetrafluoroethylene.

Yet another object of the invention is to provide an ullage tape with a carbon black coating to prevent the buildup thereon of anti-static charges.

Other objects, advantages and the nature of the invention will become readily apparent from the detailed description of the invention in connection with the accompanying drawings.

DESCRIPTION OF THE PREFERRED EMBODIMENT

Figure 1:
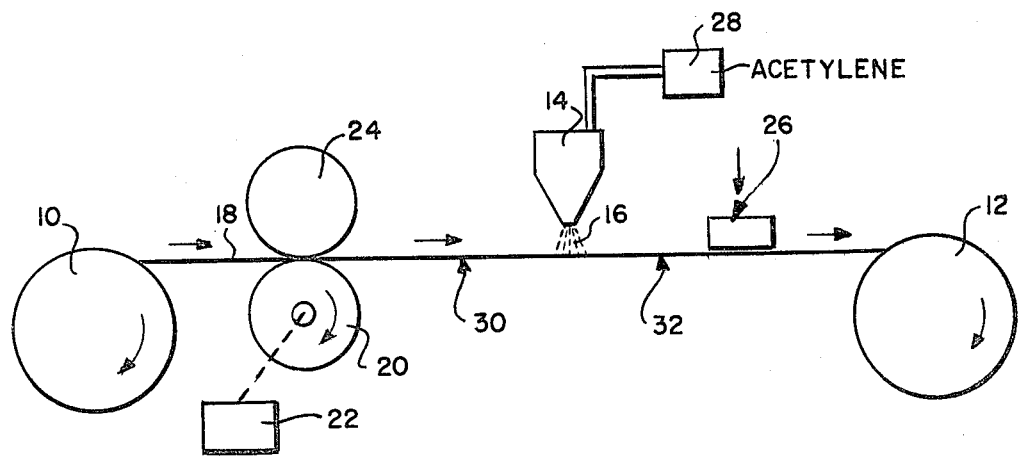
FIG. 1 is a digrammatic representation of an arrangement whereby a carbon coating can be applied to a strip of polymeric material, in accordance with the present invention method; and, FIG. 2 is a sectional view of a typical ullage tape having a polymeric covering with a carbon black coating anchored in the surface thereof.

With reference to FIG. 1, the presently preferred method of applying and anchoring a carbon black layer into the surface of a polymeric material coated ullage tape comprises feeding the tape from a feed reel 10 to a take-up reel 12 and near an acetylene torch 14 providing an acetylene rich flame 16 in close proximity to the path of the tape 18 between the feed reel 10 and take-up reel 12.

In order to maintain a taut tape 18, a drive roll 20 with a torque and speed control device 22 operates in conjunction with a pressure roll 24 to control the feed rate of the tape 18 with respect to the rate at which take-up reel 12 winds the tape thereon. These feed rollers devices (20,24) are positioned ahead of the acetylene torch 14, to enable them to grip the tape 18 while still cold before the surface has softened.

A cleaning station 26 is preferably provided downstream of the acetylene torch 14 and between torch 14 and take-up reel 12 to wipe excess acetylene black from the tape 18. It is preferable to provide the cleaning station 26 close to the position or station of the acetylene torch in order to provide a uniform coating.

Any convenient acetylene source 28 may be used to provide acetylene to the torch 14.

Supports 30 and 32 are used to support and position the tape 18 in proper proximity to the flame 16 from torch 14. These may be any convenient usually employed device such as free wheeling rollers or the like.

It is believed that the heat which results from the acetylene rich flame 16 chemically combines the carbon black with the surface of the polymeric tape 18 thereby causing the acetylene black to be fused into the surface of the tape 18. Excess acetylene black is removed at the cleaning station 26 which may simply wipe the surface of the tape 18 as it passes thereover.

Some carbon black may be anchored directly to the surface 18 by application of sufficient heat from the acetylene rich flame 16 to partially melt the surface 18. Attempts to rub carbon black on the surface 18 without the flame failed to produce a useable coating.

The speed and torque control device 22 is effective to maintain the surface of the tape 18 uniformly spaced from the acetylene torch 14 to assure a uniform and even coating on and fused into the polymeric tape 18.

Figure 2:
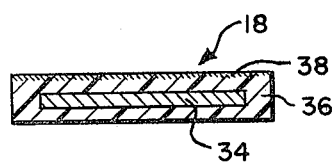

The sectional view shown in FIG. 2 is a schematic representation of an ullage tape assembly which has been impregnated with a carbon black layer such as an acetylene black layer formed by the present invention method. As is shown in FIG. 2, the ullage tape assembly comprises a tape 34 containing measurement marks (not shown) and a covering or coat formed from a fluoropolymer coating 36. When the assembly is passed under an acetylene rich acetylene flame, such as flame 16, a coating of acetylene black 38 is deposited onto and into the upper surface of the fluoropolymer coating 36. After this coating of acetylene black 38 on the surface of tape 18 has been wiped at cleaning station 26, only the layer 38 of acetylene black remains, which is embedded and chemically combined with the surface 18 as shown in FIG. 2.

What is claimed is:

1. In an ullage measuring device for measurement of liquid in a storage tank, and being of the type having a fluid level indicating device to be lowered into the storage tank on a tape formed with an electrically non-conducting outer surface; the improvement comprising:
a permanent static electric charge removal coating applied to said outer surface to dissipate static electric charge build-up on said outer surface, said removal coating consisting essentially of carbon black.

2. The ullage measuring device of claim 1 wherein said carbon black is acetylene black.

3. The ullage measuring device of claim 1 or 2 wherein said non-conducting surface is of a fluoropolymer said carbon black being anchored directly to the surface thereto by application of sufficient heat to partially melt the surface and cause a chemical reaction between the carbon black and the surface.

4. A ullage wire or tape having a fluorocarbon polymer outer surface to which a conductive coating of lamp black is anchored.

5. A method for coating the tape of an ullage measuring device with an anti-static electric coating, comprising the steps of:
establishing an acetylene rich flame;
passing the tape in close proximity to the acetylene rich flame to deposit and anchor thereon a carbon layer; and,
removing excess carbon which is not anchored to the tape surface.

6. The method of claim 5, wherein the carbon layer is deposited onto the surface of the tape and fused thereinto.

7. The method of claim 5 or 6, including:
maintaining the surface of the tape uniformly spaced relative to the rich flame to assure a uniform and even coating onto and fused into the tape.

8. The method of claim 5 further comprising positioning of the feed rollers for the tape ahead of the acetylene flame to enable them to grip the tape while still cold before the surface has softened.

* * * * *